United States Patent [19]

Willard

[11] 3,883,863

[45] May 13, 1975

[54] INTEGRATING ANALOG TO DIGITAL CONVERTER WITH VARIABLE TIME BASE

[75] Inventor: Frank G. Willard, Pitcairn, Pa.

[73] Assignee: Westinghouse Electric Corporation, Pittsburgh, Pa.

[22] Filed: Oct. 2, 1973

[21] Appl. No.: 402,684

[52] U.S. Cl. .... 340/347 NT; 235/183; 340/347 AD

[51] Int. Cl. .......... H03k 13/20

[58] Field of Search.......... 340/347 NT, 347 AD; 235/183

[56] References Cited

UNITED STATES PATENTS

| | | | |
|---|---|---|---|
| 3,354,453 | 11/1967 | Hibbits et al. | 340/347 |
| 3,500,196 | 3/1970 | Cooper | 324/120 |
| 3,530,458 | 9/1970 | Willard et al. | 340/347 |
| 3,701,146 | 10/1972 | Haga et al. | 340/347 NT |
| 3,729,733 | 4/1973 | Dorey | 340/347 NT |

FOREIGN PATENTS OR APPLICATIONS

| | | | |
|---|---|---|---|
| 1,245,578 | 9/1971 | United Kingdom | 340/347 |

*Primary Examiner*—Malcolm A. Morrison
*Assistant Examiner*—Vincent J. Sunderdick
*Attorney, Agent, or Firm*—E. F. Possessky

[57] ABSTRACT

A dual slope analog to digital converter is disclosed wherein unwanted alternating signals of a fundamental frequency and integer harmonics thereof which may be superimposed on the signal to be converted are rejected by separately introducing a signal of the fundamental frequency as an additional converter input, sensing its period and precisely integrating the analog input signal for said period. The converter remains in adjustment during periods of quescence; and is so structured that its performance is not affected by the absence of the introduced separate fundamental frequency signal, or by large magnitude transient excursions of the frequency of said unwanted signal.

22 Claims, 4 Drawing Figures

INTEGRATING ANALOG TO DIGITAL CONVERTER WITH VARIABLE TIME BASE

BACKGROUND OF THE INVENTION

Analog to digital converters frequently operate in conjunction with digital computers which monitor and control various physical processes such as steelmaking, electrical power generation, building air conditioning, and petroleum refining, for example. Such applications require that the computer periodically acquire values of many plant variables such as temperature, fluid flows, valve positions, fan speeds, and power generation which may originate at points physically remote from the computer itself. At the remote point of measurement, a device which measures such a variable produces an analog voltage corresponding to the value of the plant variable. A common practice is to install the digital computer and its associated analog to digital converter at a central plant location; and the electrical signals representing values of plant variables at the remote measurement points are transmitted to the analog to digital converter of the computer. The converter periodically selects each analog signal, measures the voltage value of the selected signal, and provides to the computer a digital signal indicating the voltage value of the analog signal selected. The computer which receives the digital signal from the analog to digital converter may employ a calibration curve to convert the measured voltage value to the digital representation of the corresponding plant variable value. The digital value then is used by the computer for its various monitoring and control functions.

In the types of applications previously mentioned, an analog voltage signal originating at a remote plant point usually appears at the analog to digital converter input contaminated by unwanted interfering voltage signals superimposed on the analog voltage signal to be measured. For example, an interfering signal encountered in industrial applications consists of alternating voltage signals of frequencies equal to that of the local alternating power supply voltage and integer multiples of that frequency. These interfering signals produce errors in the analog voltage input of the converter, rendering uncertain the digital output of the computer.

One approach in reducing the effects of unwanted interfering signals is to employ preconditioning electrical filters to remove effectively the contaminating signals from the input analog voltage signal prior to introducing the voltage signal to the analog to digital converter. Another approach is possible when the unwanted interfering signals consist of alternating voltages of a basic (fundamental) frequency and integer multiples (harmonics) of that frequency, such as on A.C. line frequency. In this case complete rejection of the unwanted signals is obtained when the analog voltage signal and its interfering signals are integrated for an interval of time equal to the period of the signal of fundamental frequency or for a time interval equal to an integral multiple of such period. These converters, which incorporate integrating devices in the converter structure, are particularly useful in completely rejecting unwanted alternating signals of a fundamental frequency and its integer harmonics when the period of the fundamental frequency signal does not vary.

However, during the use of such an integrating analog to digital converter, a problem arises when the period of the fundamental frequency signal changes; for if the time interval of integration is not changed accordingly, incomplete rejection of the unwanted signals occurs, with consequent degradation of the measurement accuracy of the input analog voltage signal. Therefore, the time interval of integration, sometimes called the time base, should be equal under all conditions to the basic period of the unwanted alternating signal.

In an integrating analog to digital converter wherein an unwanted interfering signal is directly introduced to the converter structure for purposes of sensing the period of unwanted signal and controlling the integration time base accordingly, it is desirable during temporary absence of the interfering signal as an input signal that the integration time interval be preserved at its value prior to disappearance of such signal thereby ensuring the continuing availability of the converter as a useful computer peripheral. In periods of time during which the converter is not used it is desirable that the time interval of integration be preserved at its value during the most recent conversion, thereby relieving the digital computer of the time consuming task of requesting needless conversions. Further, it is desirable to provide a converter which integrates for exactly the basic period of the interfering signal rather than in integral number of periods, since longer integration times reduce the number of conversions performed per unit of time.

Copper, et al., U.S. Pat. No. 3,500,196 discloses varying the time base of integration in an integrating analog to digital converter employing a voltage to frequency converter, but varying such time base compensates for temperature and aging effects of the voltage to frequency converter, rather than accomplishing complete rejection of an unwanted alternating signal.

F. Willard, et al., U.S. Pat. No. 3,530,458 also discloses time base variation with respect to an integrating analog to digital converter employing a voltage to frequency converter, wherein the period of the unwanted alternating signal in this case, the local alternating power supply voltage; is monitored and the time base of integration is varied by a phase locked oscillator control circuit to equal the average period of the unwanted signal for a previous time interval. Although this approach is generally effective, it is unresponsive to an unwanted alternating signal whose period changes appreciably from cycle to cycle.

F. Hibits, et al., U.S. Pat. No. 3,354,453 also discloses adjustment of the time base of integration in an integrating analog to digital converter, wherein a phase sensitive detector is used to detect the difference between the time period of the unwanted interfering A.C. signal which is applied as a separate input, and the time interval of integration. When such a difference is detected, the difference is eliminated by the phase sensitive detector operating in conjunction with a voltage controlled oscillator, the output frequency of which determines the time interval of integration. With this approach to providing a variable time base, the output frequency of the voltage controlled oscillator is sustained at its correct value by the analog to digital conversion process itself; and the oscillator frequency ordinarily drifts away from its correct value at times when no conversions are made. Thus, it is necessary to keep the converter active, even when no conversions are required, in order to maintain the oscillator frequency at its correct value. Also, the oscillator frequency may change to its maximum or minimum limit in the event that the unwanted interfering signal is absent from its input terminal, but present as a signal contaminant. In response to a large transient shift in the time period of the unwanted interfering signal, the phase sensitive detector may tend to pull out of synchronism, causing erratic converter behavior. This can occur, for example, upon a large motor startup at the end of an AC feeder line which exhibits appreciable circuit inductance.

SUMMARY OF THE INVENTION

The present invention relates to an improved dual slope analog to digital converter for converting a series of discrete voltage input signals to a series of corresponding digital output signals while rejecting by integration alternating signals superimposed on a voltage input signal wherein the superimposed signal frequencies consist of a varying fundamental frequency and integer multiples thereof. An alternating signal of the varying fundamental frequency is introduced directly to the converter and the frequency of an oscillating clock signal is controlled to maintain a constant predetermined number of clock signal oscillations during the period of the fundamental frequency signal.

In carrying out the invention by the converter provides for the coordinated operation of a fundamental signal period sensing means, clock signal generating means, a counter, a latching means, and a gating means. The signal period sensing means generates synchronizing signals which precisely define the time intervals corresponding to successive periods of the fundamental frequency signal. The generating means for the variable frequency clock signal includes a fixed frequency oscillator, and a rate multiplier connected to the oscillator to generate an oscillating clock signal of a frequency varying from that of the fixed frequency oscillator in accordance with the content of an updown counter. An up-counter responsive to the synchronizing signals counts oscillations of the lock signal to monitor whether the predetermined number occurs in each period of the fundamental frequency signal. At the end of a counting interval, the state of a predetermined counter bit signifies the direction in which the oscillation count deviates from the desired number. The latching means samples the state of the counter bit at the end of each counting interval and generates output signals defining the direction of change of the up-down counter content to correct any deviation of the oscillation count. The gating means is responsive to the latch output signals, and changes the content of the up-down counter by one count on each occurrence of a signal, indicating that a conversion has been requested, but is not in progress. Thus, in response to a change of the period length of the fundamental frequency signal, the content of the up-down counter is changed in a series of unit increments until the clock signal frequency satisfies the desired number of oscillations in the new period. The gating means are additionally responsive to the output of a fundamental signal detector, wherein the detector changes the state of its output signal thereby causing the gating means to inhibit change of the up-down counter content during absence of the fundamental signal. During periods of converter quiescence, the up-down counter content is not changed; therefore the constancy of the clock signal frequency is maintained by the counter throughout the quiescence without outside intervention.

In a conversion, a voltage input signal is integrated for a time interval during which the constant predetermined number of oscillations occur, thereby accomplishing total cancellation of the effects of the superimposed alternating signals.

DETAILED DESCRIPTION OF THE PREFERRED EMBODIMENT

Figure 1:
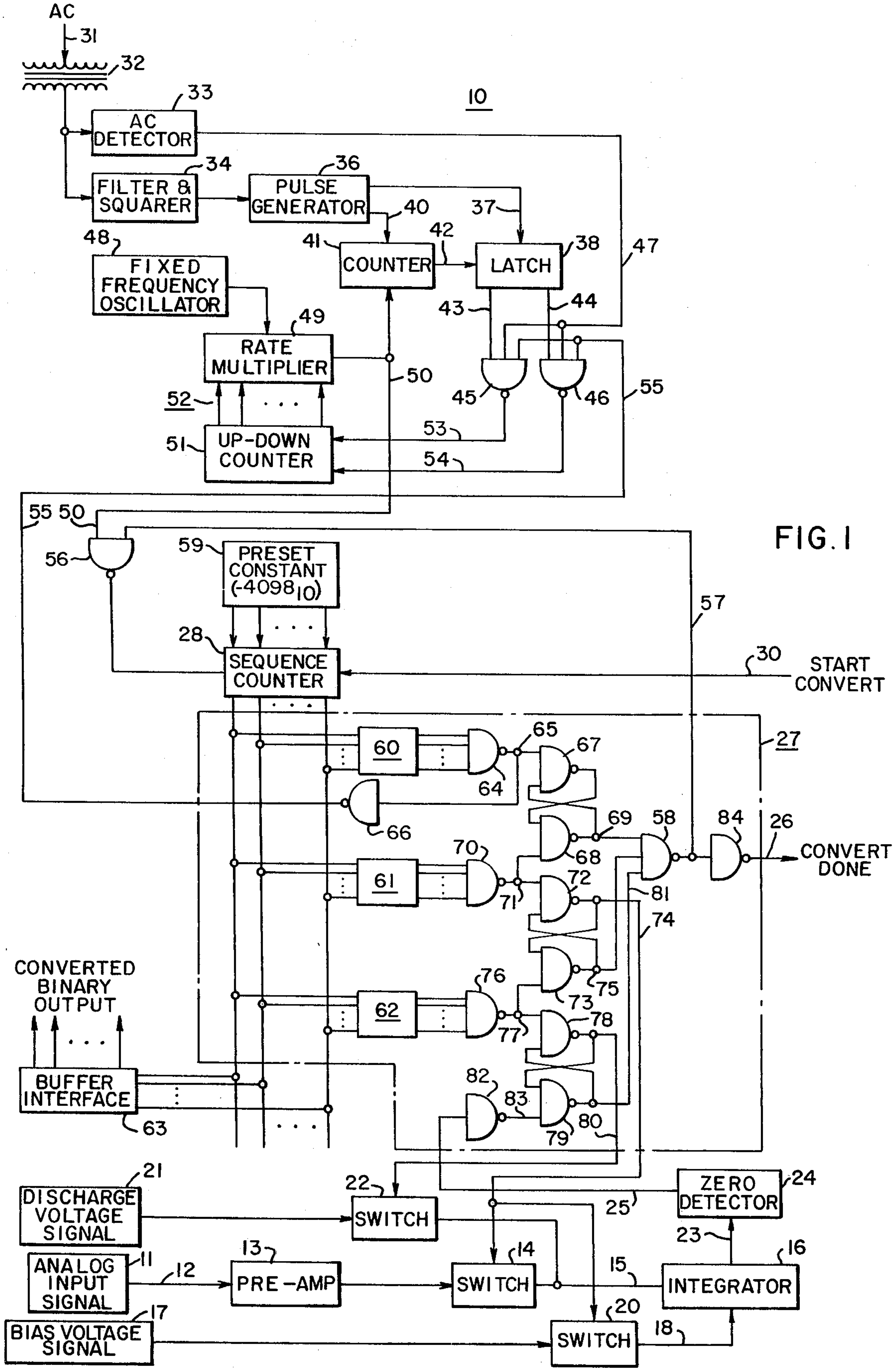
FIG. 1 is a block diagram of a dual slope analog to digital converter according to one embodiment of the invention.

Referring to FIG. 1, a dual slope analog to digital converter generally referred to as 10 according to one embodiment of the invention receives an analog input signal from a source 11 remote from the converter 10. The analog input signal is the composite of an analog voltage to be measured and a superimposed alternating voltage. The analog input signal is conducted over line 12 through a constant gain preamplifier 13 and through a switch 14 and input line 15 to an integrator 16.

A bias voltage signal from a conventional source 17 is applied to input 18 of the integrator 16 through a switch 20. The biasing signal is of a magnitude equal at least to the magnitude of the most negative voltage input signal applied to the input 15 of the integrator 16 in order to maintain a positive value for the net input signal of integrator 16 over a predetermined range of voltage values from the source 11.

A discharge voltage signal of opposite polarity of the net input signal of integrator 16 is also applied to the input 15 of the integrator through a switch 22 for causing the integrated voltage input signal from source 11 to discharge toward zero volts at the end of the period of integration. When the output signal on line 23 reaches zero volts, it is detected by detector 24 to produce an output, or so-called raised signal on line 25 for producing a signal at output 26 to denote completion of an analog voltage conversion.

The integration and discharge of the analog input signal is controlled by the operation of the switches 14, 20, and 22, which in turn are controlled by circuitry within the dashed lines referred to at 27 which functions as a sequence controller to be described hereinafter.

The sequence controller circuitry 27 is operated by a counter 28 which is controlled by a signal on line 30 from an external data processing device (not shown) for initiating the conversion of an analog input signal from source 11.

An alternating voltage which can influence the value of the analog voltage on line 12 is connected at input 31 to the primary side of an isolation transformer 32, the secondary side of which is connected in parallel to an AC detector 33 for producing an output signal when an AC voltage is present; and to a filter and waveform squaring device 34 for removing high frequency signals that may cause multiple crossings of the AC signal through its zero axis, and to convert the AC sine voltage to a square wave. A pulse generator 36 is connected to the output of the squarer 34 and generates two short closely spaced pulses in the order of one microsecond in duration, or example, each time the squared AC voltage increases in a positive direction, or in other words, at the beginning of each cycle of the alternating voltage. The first of the closely spaced pulses is generated at output 37 of the generator 36 and serves as the synchronizing input to latch 38. The second of the closely spaced pulses is generated at output 40 of the generator 36 and is connected to reset a counter 41. Counter 41 has thirteen bits, and signal 42, representing the state of the most significant counter bit, is connected to the input of latch 38. The voltage level of signal 42 is high when the bit state is one (set). The voltage level of signal 42 is low when the bit state is zero (unset). In the one state, the thirteenth bit represents a contribution of $2^{(13-1)} = 2^{12} = 4{,}096$ to the total number of counts. Latch 38 samples signal 42 in response to the first pulse signal at output 37 of pulse generator 36. Latch 38 generates signals at outputs 43 and 44, the signal at output 44 having the same level as signal 42 while the signal level at output 43 is the inverse of that of signal 42. If the most significant counter bit is set, in other words, in the one state, then the level of signal 42 is high, and this high signal level is sampled by latch 38 when pulse 37 occurs. In response, latch 38 raises output signal 44, and lowers output signal 43. Output signals 43 and 44 remain at these levels until the next occurrence of pulse 37, when they may change, depending on the state of the most significant counter bit. Signal 43 is connected to NAND gate 45, while signal 44 is connected to NAND gate 46. Output signal 47 of AC detector 33 is connected to NAND gates 45 and 46.

Fixed frequency oscillator 48 generates an oscillating output signal of constant predetermined frequency. Rate multiplier 49 is connected to the output of oscillator 48 and generates an oscillating output signal 50 of a frequency departing from that of the fixed frequency oscillator signal in accordance with the content of up-down counter 51. Signal 50, also called a clock signal, is connected to counters 41 and 28, which are responsive to count oscillations of signal 50. The signals representing the bary states of the bits of counter 51 are connected to rate multiplier 49 on lines 52. Signal 53, the output signal of NAND gate 45, and signal 54, the output signal of NAND gate 46, are connected to the inputs of up-down counter 51. The level of signal 53 normally is high; each time the signal is lowered in a negative-going pulse, by NAND gate 45, up-down counter 51 increases its content by one count and the frequency of signal 50 increases accordingly. The level of signal 54 also is normally high; each time the signal is lowered in a negative-going pulse by NAND gate 46 up-down counter 51 decreases its content by one count, and the frequency of signal 50 decreases accordingly. If neither input signal is lowered in a negative-going pulse, then the content of up-down counter remains constant and the frequency of signal 50 accordingly remains constant. Signal 55, a positive-going pulse signal generated by sequence controller 27, is connected to NAND gates 45 and 46.

In operation, filter and squarer 34, in conjunction with pulse generator 36, generates pulses 37 and 40 at each upward crossing of the AC voltage through zero volts. Therefore, the time interval between successive occurrences of pulse signal 40 is equal to the period of the AC voltage. Because the content of counter 41 is zeroed at each occurrence of pulse signal 40, successive occurrences of pulse signal 40 define successive counting intervals wherein the time length of each interval is equal to the period of the AC voltage. At the beginning of a counting interval, the content of counter 41 is zero. During the interval, counter 41 counts upwardly the oscillations of clock signal 50, adding one count for each oscillation. At the end of the counting interval, the state of the most significant counter bit is sampled by latch 38, and the content of counter 41 is zeroed immediately thereafter, whereupon the next counting interval begins.

Because latch 38 is responsive to the thirteenth bit of counter 41, 4,096 is thereby established as a target number of oscillations of clock signal 50 to occur in one period of the AC voltage, although the period length may vary from cycle to cycle. Although latch 38 could be responsive to another bit of counter 41, the conversion accuracy would be affected as herinafter discussed. At the end of a counting interval, the state of the most significant bit of counter 41, bit thirteen, indicates whether the target number of oscillations have occurred. If bit thirteen is set, (one) then counter 41 has counted at least 4,096 oscillations, since the content of the counter with only the highest bit set is 4,096. If bit thirteen is not set, (zero) then counter 41 has counted at most 4,095 oscillations, since the content of the counter with all bits set except the highest is 4,095. If the frequency of clock signal 50 is low whereby fewer than 4,096 oscillations of the clock signal occur in an AC voltage period, then the state of bit 13 as sampled by latch 38 at the end of the counting interval, is zero. If the frequency of clock signal 50 is high, whereby more than 4,096 oscillations of the clock signal occur in an AC voltage period, then the state of bit 13, as sampled by latch 38 at the end of the counting interval, is one.

The level of signal 42, sampled by latch 38 in response to pulse signal 37 represents the state of counter bit 13 at the end of a counting interval. If the state of bit 13 is one, the level of signal 42 is high. Similarly, the level of signal 42 is low if the state of bit 13 is zero. Therefore, the level of signal 42, as sampled by latch 38 at the end of a counting interval, represents the direction of frequency error of clock signal 50. When the clock signal frequency is high, more than 4,096 counts accumulate in one counting interval, and the level of signal 42 is high. When the clock signal frequency is low, fewer than 4,096 counts accumulate in one counting interval, and the level of signal 42 is low. In response to the level of signal 42, latch 38 generates signals 43 and 44, the levels of which specify the direction of change of the content of up-down counter 51 to correct the frequency error. The level of signal 43 is opposite that of signal 42, while the level of signal 44 is the same as that of signal 42. The levels of signals 43 and 44 are constant during a counting interval and they can change only at the end of a counting interval, when latch 38 is refreshed by another sampling of signal 42.

While latch signals 43 and 44 are continuously available to specify the direction of incremental change of content of up-down counter 51 for correction of frequency error of clock signal 50, the content of counter 51, which determines the frequency of signal 50 is changed only at discrete points of time, under control of NAND gates 45 and 46. In general, the output signal of a NAND gate is at a high level whenever at least one of the gate input signal levels is low, and the output signal is lowered by the gate only when all of the gate input signal levels are high. As previously stated, counter 51 adds one count in response to a negative-going pulse of signal 53, or subtracts one count in response to a negative-going pulse, of signal 54. During a conversion signal 55 is low and NAND gates 45 and 46 responsively hold signals 53 and 54 high. Between conversions, signal 55 is momentarily raised in a positive-going pulse; assuming that signal 47 is high, NAND gate 45 generates a negative-going pulse of signal 53 if signal 43 is high and signal 44 is therefore low, or NAND gate 46 generates a negative-going pulse of signal 54 if signal 44 is high and signal 43 is therefore low. After the positive-going pulse, signal 55 returns to its former low level, and that one of signals 53 and 54 which was lowered returns to its former high level. At each discrete point of time determined by a pulse of signal 55, the content of counter 51 therefore changes by one count, and remains at its new value until the next pulse of signal 55. Because pulses of signal 55 occur only between conversions, the frequency of clock signal 50 is constant during a conversion.

Because 4,096 is the target number of oscillations of signal 50 to occur during one period of the AC voltage, a typical value of the frequency of signal 50 for an AC frequency of 60 hertz is 4,096 * 60 = 245,700 hertz. Rate multiplier 49 cancels approximately half of the oscillations of the output signal of oscillator 48; therefore, the output signal frequency of oscillator 48 is 0.5 megahertz. As the content of counter 51 increases, rate multiplier 49 increases the frequency of signal 50. Similarly, as the content of counter 51 decreases, rate multiplier 49 decreases the frequency of signal 50. Up-down counter 51 and rate multiplier 49 therefore comprise the mechanism which controls the frequency of clock signal 50. Latch signals 43 and 44 determine the direction of frequency corrections, in other words, whether the frequency increases or decreases. NAND gates 45 and 46, in conjunction with signals 47 and 55, determine the discrete points of time at which the frequency is corrected. The correction of counter 41, latch 38, NAND gates 45 and 46, up-down counter 51 and rate multiplier 49 therefore comprise a digital control loop which controls the frequency of clock signal 50 to achieve a target number of oscillations, in each period of the AC voltage, although the AC period may vary.

Figure 2:
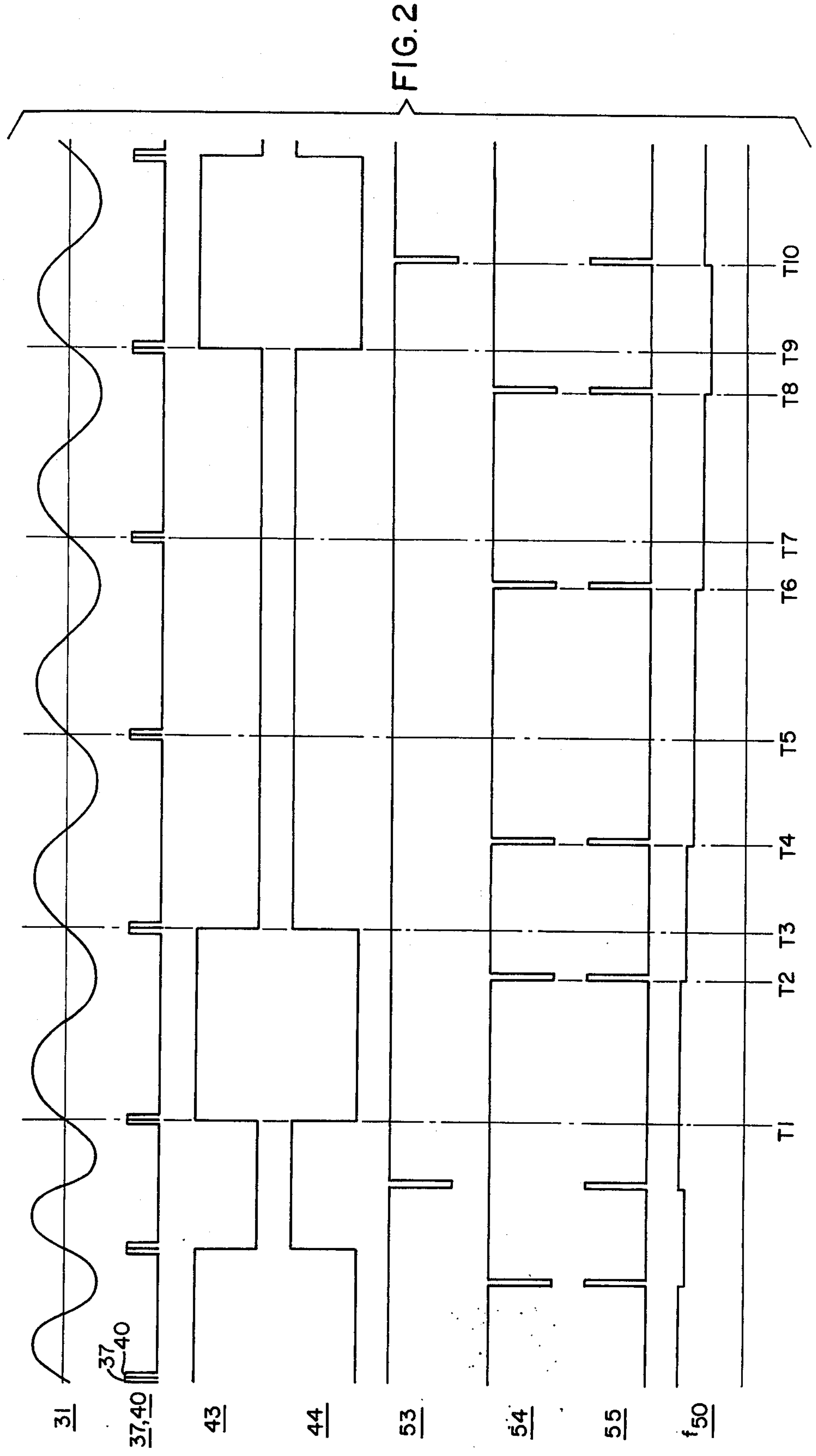
FIG. 2 illustrates graphically a fundamental frequency AC signal and in time correspondence the behavior of various synchronizing and controlling signals.

The control of the frequency of clock signal 50 to achieve 4,096 oscillations in an AC voltage period is best understood with reference to FIG. 2. An unwanted superimposed AC voltage signal is illustrated, to have a constant frequency until it changes at time T1 to a lower frequency thus increasing the period of the AC voltage to a new steady value. In time correspondence there are shown pulse signals 37 and 40, latch output signals 43 and 44, up-down counter input signals 53 and 54, pulse signal 55, and the frequency of clock signal 50, $f_{50}$.

At each upward crossing of the AC voltage signal 60 through zero volts, pulse signals 37 and 40 are generated by pulse generator 36, thereby defining successive periods of the AC voltage signal and corresponding successive counting intervals. Latch output signals 43 and 44 are constant during a counting interval, and change only at the end of an interval. Although the period of the AC voltage is constant prior to its change at time T1, it is not possible to achieve exactly 4,096 oscillations in each AC voltage period, and the oscillation count alternates between 4,095 and 4,096. This alternation characterizes the steady state response of the digital control loop. Thus, bit 13 of counter 41 is alternately set and unset at the end of successive counting intervals, causing latch 38 to sample a succession of signals representing the alternation of bit 13 between one and zero. In the steady state, latch 38 alternately raises and lowers signals 43 and 44 in response to the alternation of the state of bit 13.

Signals 53 and 54, the input signals of up-down counter 51, are raised between pulses of signal 55, and only one of them is momentarily lowered in response to each occurrence of pulse signal 55, assuming that signal 47 is raised. If signal 44 is high, then NAND gate 46 lowers signal 54 in response to pulse signal 55 while NAND gate 45 holds signal 53 high in response to the low level of signal 43. In response to the lowering of signal 54, updown counter 51 subtracts one count, and the frequency of clock signal 50, $f_{50}$, decreases accordingly. If signal 43 is high, then NAND gate 45 lowers signal 53 in response to pulse signal 55 while NAND gate 46 holds signal 54 high in response to the low level of signal 44. In response to the lowering of signal 53, up-down counter 51 adds one count, and the frequency of clock signal 50 increases accordingly. In the steady state signals 53 and 54 are alternately lowered in response to successive pulses of signal 55, with the consequence that clock signal frequency $f_{50}$ alternates between values which result in 4,095 and 4,096 oscillations per AC voltage period. This alternation continues through time T2.

At time T1, the period of the AC voltage increases to a new steady state value, and the frequency of clock signal 50 consequently is too high, resulting in more than 4,096 oscillations per AC period. Time T3 marks the end of the first AC voltage period after the period change at time T1. At T3, counter 41 bit 13 is set, as more than 4,096 oscillations occurred in the interval between T1 and T3. At T3, latch 38 samples a level of signal 42 indicative that bit 13 is set, and the latch raises signal 44 and lowers signal 43, as shown. However, the frequency of clock signal 50 is not changed until T4, the time of occurrence of pulse signal 55. At T4, signal 54 is lowered, up-down counter 51 subtracts one count, and the frequency of clock signal 50 decreases accordingly. But the frequency of the clock signal is still too high, and at time T5 counter bit 13 is again set, since more than 4,096 oscillations occurred in the time interval between T3 and T5. Latch 38 again samples a value of signal 42 indicative that bit 13 is set, and in response holds signal 43 low and signal 44 high. The frequency of clock signal 50 is not changed until T6, the time of next occurrence of pulse signal 55. At T6 signal 54 is lowered again, up-down counter 51 subtracts another count, and the frequency of clock signal 50 again decreases accordingly. At T7, counter bit 13 is set again, indicating that the clock signal frequency is still too high, and latch 38 responsively holds signal 43 low and signal 44 high. At T8, signal 54 is lowered again in response to pulse signal 55, and the clock signal frequency again decreases accordingly. At T9, counter bit 13 is not set, as the frequency of the clock signal is now sufficiently decreased to produce 4,095 oscillations per AC voltage period. At T9, latch 38 samples a value of signal 42 indicative that bit 13 is not set, and latch 38 responsively lowers signal 44 and raises signal 43. At T10 signal 53 is lowered, up-down counter 51 adds one count, and the frequency of clock signal 50 increases accordingly. Thereafter, the steady state pattern of signals recurs, and the number of oscillations counted in each interval alternates between 4,095 and 4,096. The example of FIG. 2 is intended only to illustrate the operation of the digital control loop; control of the frequency of signal 50 is equally effective where the period of the AC voltage changes gradually, or when it changes at some point of the AC cycle other than a zero axis crossing.

As shown in FIG. 2, the oscillation count in the steady state, when there is no persistent count error, alternates between 4,096, for which the thirteenth bit is set, and 4095, for which the thirteenth bit is not set. Alternation of the oscillation count between two values bounding the target value results from the discrete nature of the control loop. Howeve, the separation of the two values is determined by the number of bits of up-down counter 51 and rate multiplier 49. In the preferred embodiment, each is a 12 bit device so that one incremental oscillation is counted per counting interval for a corresponding unit increment of the content of up-down counter 51. If counter 51 and rate multiplier 49 were 10 bit devices, then four incremental oscillations per counting interval would result for a unit increment of the content of counter 51. Then the oscillation count would alternate, for example, between 4,098 and 4,094. Thus, the bit length of the up-down counter and the rate multiplier may be selected to minimize to one count the separation of the oscillation counts bounding the target value. However, the effect of that separating count depends on the significance of the bit of counter 41 to which latch 38 is responsive.

In the preferred embodiment counter 41 has 13 bits, and the desired value of the oscillation count per counting interval is 4,096 when latch 38 is responsive to the thirteenth bit. A variation of one count in 4,096 is approxiamtely 0.025%. This value also is the percentage error of the integration interval over which a voltage input signal is integrated. A 13 bit counter is used because this percentage error is acceptable in most applications.

If latch 38 were responsive to the twelfth bit of counter 41, the state of bit 12 would be zero (not set) for all counts less than or equal to 2,047, and one (set) for counts 2,048 or greater, as $2^{(12-1)} = 2^{(11)} = 2,048$; therefore the clock signal frequency would be controlled to achieve 2,048 oscillations per period of the AC voltage. Then a variation of one count in 2,048 would result in a percentage error of the integration interval of 0.05%. By similar argument, if latch 38 were responsive to the eleventh bit of counter 41 a variation of one count would accordingly cause a percentage error of the integration interval of 0.1%, generally deemed unacceptable. In this discussion counter bits are numbered in order of increasing significance, wherein the first bit corresponds to the zeroeth power of two. The highest numbered bit is thereby the most significant.

In response to change of the period of the AC voltage the clock signal frequency is controlled to compensate the period change and thereby to maintain an oscillation count of 4,096 per counting interval, as shown in FIG. 2. The rate of compensation in the preferred embodiment is essentially one incremental count of up-down counter 51 per conversion, equivalent to one incremental oscillation count per counting interval per conversion. In some power systems the period of the AC voltage jitters; that is, the length of a particular period differs randomly from that of a past period, wherein the average difference is zero, but percentage differences of 0.025% or more occur frequently, and infrequently the percentage difference may be 0.1%. It is beneficial to conversion accuracy to detect these cycle-to-cycle variations of the AC voltage period and to vary the integration interval of the converter accordingly. A device which averages the AC period over the past several seconds is incapable of compensating cycle-to-cycle variations. The preferred embodiment, however, is responsive to such cycle-to-cycle period variations, as a period variation of 0.025% is compensated by the addition or subtraction of one count by up-down counter 51 and the compensation therefore is effected at initiation of the next conversion subsequent to the period change. Longer term period changes occurring less frequently than cycle-to-cycle changes are compensated as in the example of FIG. 2.

FIG. 2 illustrates the inherent asynchronism between the end of a counting interval, when the state of bit 13 signifies the direction of frequency error of clock signal 50, and the occurrence of pulse signal 55, when the frequency of the clock signal is corrected. Pulse signal 55 occurs only between conversions, ensuring that the clock signal frequency is constant during a conversion. Successive pulse signals are not equally spaced in time, because the length of time required for a conversion depends on the voltage value of the analog imput signal. Thus the end of a counting interval rarely coincides with a pulse of signal 55. Therefore, the clock signal frequency cannot be corrected meaningfully in response to pulse signal 55 unless the state of bit 13 at the end of the past counting interval is remembered at least until the occurrence of the next pulse signal. This memory function is performed by latch 38.

In event of AC voltage absence, AC detector 33 lowers signal 47. NAND gates 45 and 46 responsively hold their output signals raised, inhibiting change of the content of counter 51 for the duration of the absence. Thus, the frequency of clock signal 50 is maintained at a satisfactory value, and the accuracy of the conversions is preserved in absence of the AC voltage signal. If the AC detector and its output signal are eliminated from the structure, conversion accuracy deteriorates during absence of the AC voltage.

When the converter is quiescent, no pulses appear in signal 55, which remains low for the duration of the quiescence. In response, NAND gates 45 and 46 hold signals 53 and 54 high. Therefore, the content of counter 51 is constant during the quiescent period, and consequentially the frequency of clock signal 50 remains constant during the quiescence. The clock signal frequency thus is maintained at a satisfactory value during quiescence, and accurate conversions may be resumed whenever desired. Furthermore, signals 43 and 44, generated by latch 38, register the direction of clock signal frequency correction at all times during quiescence, enabling a correction preceding the first resumed conversion.

When there is a large disturbance of the period of the AC voltage, lasting for a few cycles only, the content of counter 51 is incremented by one count for each conversion executed in the time interval of the period disturbance. Therefore, the number of counts constituting the total increment change in response to the disturbance is limited to the number of cycles over which the disturbance occurs. If the period returns to its length prior to the disturbance, then up-down counter 51 counts back to its content prior to the disturbance, counting back one count for each conversion executed subsequent to the end of the period disturbance. The response of clock signal 50 to this large scale transient period disturbance is a modest increase or decrease of frequenct during the disturbance, followed by a return to the initial frequency when the disturbance is past. Large, prolonged changes of clock signal frequency is avoided, thereby assuring conversion accuracy during and after such appreciable transient disturbances of the AC voltage period.

Withe respect to the detailed circuitry of the sequence counter 27, and referring to FIG. 1, two input signals, clock signal 50 and signal 57, the output signal of NAND gate 58 are connected to NAND gate 56. The output signal of NAND gate 56 is connected to counter 28. When signal 57 is lowered by NAND gate 58, NAND gate 56 responsively holds its output signal raised. When NAND gate 58 raises signal 57, the output signal of NAND gate 56 oscillates at the same frequency as that of clock signal 50, and counter 28 counts oscillations of the clock signal, adding one count per oscillation.

The output signals of block 59 are constant voltage signals, having levels which are high or low. There is a one-to-one correspondence between output signals of block 59 and bits of counter 28, wherein the level of a particular signal depends on the state of the corresponding bit of counter 28 when the content of that counter is $-4{,}098_{10}$. A signal of block 59 is high when the state of the corresponding bit is one at content $-4{,}098_{10}$, or low when the state of the corresponding bit is zero. The output signals of block 59 are connected to counter 28, and the content of counter 28 is initialized at $-4{,}098_{10}$ when signal 30 is raised by an outside data processor (not shown).

The bit signals of counter 28 are connected in parallel to encoders 60, 61 and 62 and to buffer interface 63. The output signals of encoder 60 are uniformly high when counter 28 contains $-4{,}098_{10}$; logical inverters are employed in encoder 60 to raise those bit signals of counter 28 which are low at the particular content $-4{,}098_{10}$. The output signals of encoder 60 are connected to the inputs of NAND gate 64. The output of NAND gate 64, signal 65, is lowered only when counter 28 contains $-4{,}098_{10}$, and is raised at all other contents. NAND gates 67 anmd 68 are connected as a flip-flop. Signal 65 is connected to NAND gate 67. Signal 65 also is connected to NAND gate 66 which generates pulse signal 55. Signal 69, the output signal of NAND gate 68, is connected to NAND gate 58.

The output signals of encoder 61 are uniformly high when counter 28 contains $-4{,}098_{10}$; logical inverters are employed in encoder 61 to raise those bit signals of counter 28 which are low at the particular content $-4{,}098_{10}$. The output signals of encoder 61 are connected to the inputs of NAND gate 70. The output of NAND gate 70, signal 71, is lowered only when counter 28 contains $-4{,}098_{10}$, and is raised at all other contents. NAND gates 72 and 73 are connected as a flip-flop. Signal 71 is connected to NAND gates 68 and 72. Signal 74, the output signal of NAND gate 72, is connected to switches 14 and 20, which are closed when signal 74 is high and open when signal 74 is low. Signal 75, the output signal of NAND gate 73, is connected to NAND gate 58.

Encoder 62 inverts all bit signals of counter 28; therefore, the output signals of encoder 62 are uniformly high when counter 28 contains zero. The output signals of encoder 62 are connected to the inputs of NAND gate 76. Signal 77, the output signal of NAND gate 76, is lowered only when counter 28 contains zero, and is raised at all other contents. NAND gates 78 and 79 are connected as a flip-flop. Signal 77 is connected to NAND gates 73 and 78. Signal 80, the output signal of NAND gate 78, is connected to switch 22, which is closed when signal 80 is high, and open when signal 80 is low. Signal 81, the output signal of NAND gate 70, is connected to NAND gate 58. Signal 25, the output signal of zero detector 24, is connected to the input of NAND gate 82. Signal 83, the output signal of NAND gate 82, is connected to NAND gate 79. The output signal of NAND gate 58 is connected to NAND gate 84, which raises output signal 26 to indicate to an outside digital data processor (not shown) that a conversion is finished.

Figure 3:
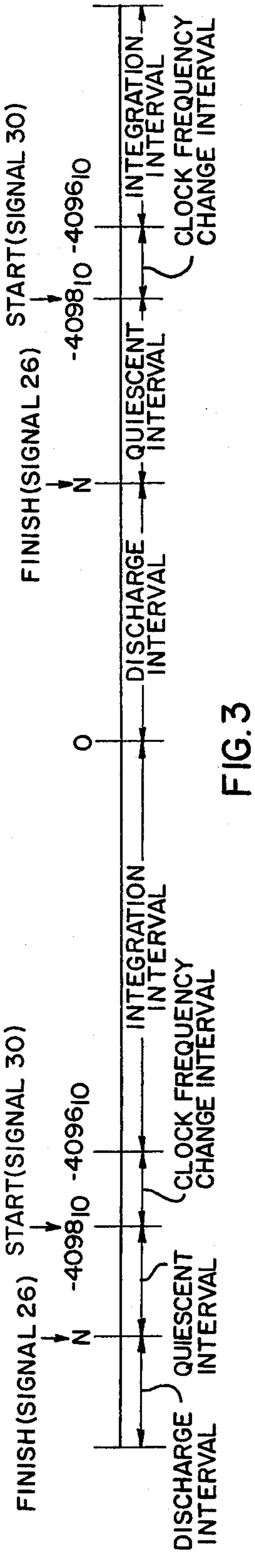
FIG. 3 shows the sequence of operations of the converter.

The bit signals of counter 28 also are connected to buffer interface 63, which stores the binary content of counter 28 when a conversion is finished. At the end of a conversion, the content of buffer interface 63 may be acquired by an outside digital data processor (not shown). As shown in FIG. 3, there are four basic intervals in the operation of the converter 10. Beginning with a quiescent interval, a variable duration which is often zero when the converter is busy, there follow a clock frequency change interval, an integration interval, during which the analog input signal is integrated, a discharge interval, during which the integrator output signal is discharged to zero, followed by another quiescent interval. As shown below the bar line, a conversion is initiated when signal 30 is generated by an external digital data processor, and finishes when sequence controller 27 raises signal 26, indicating completion of conversion to the outside data processor. The conversion process consists of the integration interval and the subsequent discharge interval. The content of counter 28 is shown above the bar line, corresponding to the various intervals of operation. When a conversion is initiated by signal 30, the content of counter 28 is $-4{,}098_{10}$. After initiation of a conversion, counter 28 counts upwardly oscillations of clock signal 50. Between counts $-4{,}098_{10}$ and $-4{,}096_{10}$, the frequency of clock signal 50 is changed, but input signal integration has not commenced. Integration of the analog input signal commences at $-4{,}096_{10}$, and continues in time until the count of zero. At count zero, integration is terminated, and discharge commences. At the end of a discharge period, the content of counter 28 is N, a variable number of counts related to the voltage value of the measured analog voltage.

In response to signal 30, counter 28 is initialized at the content $-4{,}098_{10}$, as specified by the output signals of block 59. With counter 28 initialized at $-4{,}098_{10}$, NAND gate 64 lowers signal 65, and in response NAND gate 66 raises signal 55, permitting frequency change of clock signal 50. Also in response to the lowering of signal 65, the flip-flop comprised of NAND gates 67 and 68 is set, whereby NAND gate 68 lowers signal 69. Signal 69 is held low until the flip-flop is reset at content $-4,096_{10}$. Because signal 69 is low, NAND gate 58 raises signal 57, permitting counter 28 to count oscillations of clock signal 50, thereby causing the content of the counter to increase upwardly from the initial value $-4,098_{10}$.

At count $-4,097_{10}$, at least one output signal of block 60 is low, and NAND gate 64 responsively raises signal 65, and in response NAND gate 66 lowers signal 55, thereby generating positive pulse of signal 55 between contents $-4,098_{10}$ and $4,097_{10}$. Signal 65 remains raised for the duration of the conversion.

At count $-4,096_{10}$ NAND GATE 70 lowers signal 71, and in response the flip-flop consisting of NAND gates 67 and 68 is reset, whereby signal 69 is raised, and remains raised for the duration of the conversion. Also in response to lowering of signal 71, the flip-flop consisting of NAND gates 72 and 73 is set, thereby raising signal 74, and closing switches 14 and 20, causing integration of the analog input signal and the bias voltage signal to commence, and lowering signal 75. At count $-4,095_{10}$, at least one output signal of block 61 is low, and NAND gate 70 raises signal 71, which remains raised for the duration fo the conversion. However, the flip-flop comprising NAND gates 72 and 73 remains set until counter 28 counts up to zero. Therefore, integration begins at count $-4,096_{10}$ and continues until count zero. The time interval between counts $-4,098_{10}$ and $-4,096_{10}$ constitutes a time window during which the frequency of clock signal 50 changes to a new constant value. The times window is sufficiently wide that the change of clock signal frequency is complete when integration begins at $-4,096_{10}$.

At count zero, the output signals of block 62 are uniformly high, and NAND gate 76 responsively lowers signal 77, causing the flip-flop consisting of NAND gates 72 and 73 to reset, whereby signal 75 is raised and signal 74 is lowered. Signal 75 remains raised for the duration of the conversion. With signal 74 lowered, switches 14 and 20 are opened, terminating the integration period. Signal 74 remains lowered for the duration of the conversion. In response to the lowering of signal 77 at count zero, the flip-flop consisting of NAND gates 78 and 79 is set, whereby signal 81 is lowered and signal 80 is raised, closing switch 22 and causing discharge of integrator 16 to commence. After count zero, counter 28 continues to count, and the flip-flop remains set until the integrator is discharged to zero as detected by zero detector 24. As shown in FIG. 3, the number of counts between zero and the end of discharge is a variable, depending on the voltage level of the measured analog voltage.

When integrator 16 is discharged, zero detector 24 raises signal 25, and in response NAND gate 82 lowers signal 83, causing the flip-flop consisting of NAND gates 78 and 79 to reset, whereby signal 81 is raised and signal 80 is lowered causing switch 22 to open, and terminating discharge of integrator 16.

When integrator 16 is discharged, the content of counter 28 signifies the voltage value of the measured analog voltage. To preserve the content for possible use by the digital data processor, it is necessary to inhibit counting when integrator 16 is discharged. This function is performed by NAND gate 58. As above mentioned, signal 69 was raised for the duration of the conversion in response to content $-4,096_{10}$, and signal 75 was raised for the duration of the conversion in response to content zero. Signal 81 was raised when integrator discharge was terminated. With the raising of signal 81, signals 69, 75 and 81 are simultaneously raised, and NAND gate 58 responsively lowers signal 57, thereby inhibiting counting at the end of discharge. At the same time, NAND gate 84 raises signal 26, notifying the digital data processor that a conversion is finished.

Figure 4:
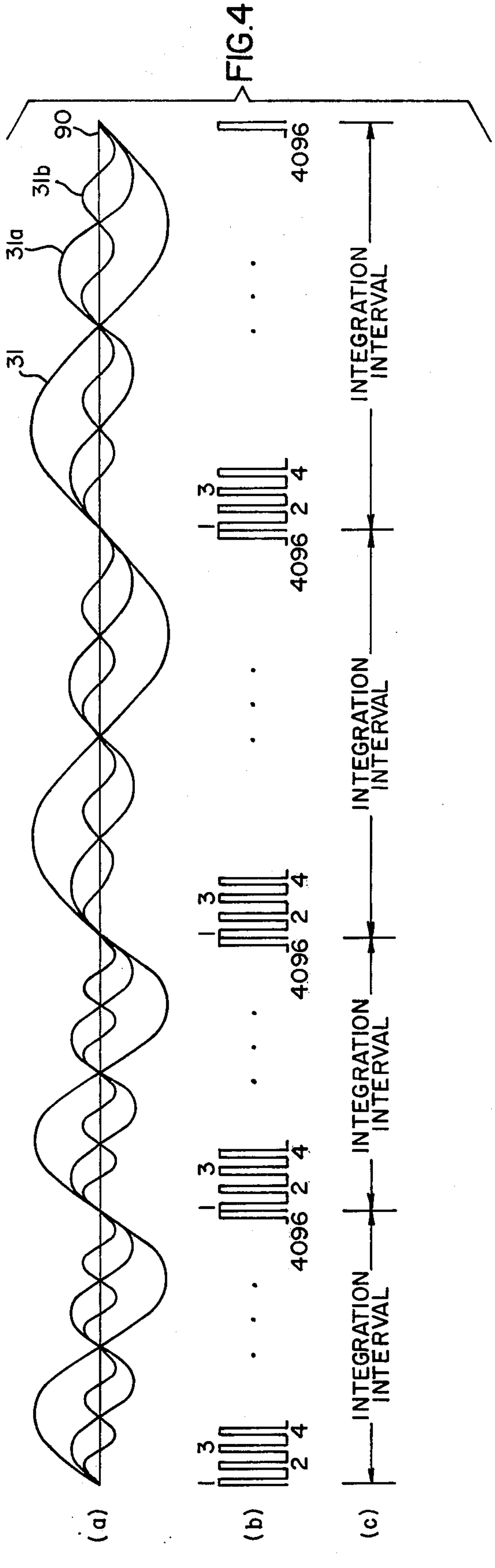
FIG. 4 shows a change of the period of the AC voltage and the compensating adjustment of the integration interval.

FIG. 4 illustrates the advantage of integrating for 4,096 counts of the clock signal, wherein the clock signal frequency is controlled to achieve 4096 oscillations in one period of the AC voltage. Curve (*a*) shows a constant analog voltage signal 20 with superimposed alternating signals of the frequency of the AC voltage 31 and two integer multiples of that frequency, denoted as 31*a* and 31*b* which may or may not be present. Together, these signals constitute what is termed herein the analog input signal 11. Curve (*b*) shows the clock signal 50, the frequency of which is controlled to achieve 4,096 oscillations in each AC voltage period. Curve (*c*) shows the time duration of the integration interval, wherein the time span of the integration interval is equal to the AC voltage period. In the integration process, positive contributions to the integral of those portions of the alternating signals which are above the level of the voltage input signal are exactly cancelled by negative contributions of those portions of the alternating signals which lie below the level of the voltage input signal. Thus, the integral is a function of the analog voltage signal only.

In curve (*a*) the period of the AC voltage signal 31 increases after two cycles. Period changes may result from imbalances of load and generation in the power system which supplies the AC voltage or from local disturbances, such as large motor startups, which may result in significant, though temporary, changes of the AC voltage period. If the integration interval is not changed, then the effects on the integral of the superimposed alternating signals are cancelled incompletely, and the integral is no longer dependent only on the analog voltage signal, thereby introducing significant error in the determination of the voltage value of the analog voltage signal in the subsequent discharge period. This circumstance is avoided, however, because the clock signal frequency is decreased to compensate for the increased AC voltage period so that 4,096 oscillations of the clock signal still occur during one AC voltage period, as shown in curve (*b*). Because the analog input signal is integrated for 4,096 counts, curve (*c*) shows that the integration interval is longer and equal in length to the new AC voltage period. Thus, integration still completely cancels the effects of the alternating signals, and the accuracy of the conversions is preserved, despite the appreciable change of the AC voltage period.

At the end of a discharge interval, the content of counter 28, as resident in buffer interface 63, signifies the voltage value of the analog voltage signal. An outside digital data processor, if desired, may convert the binary content of buffer 63 to the voltage value of the input signal using the formula:

$$E_{SIGNAL} = (E_{DIS} * N/4,096 * g) - (E_{BIAS}/g)$$

wherein:

$N$ = content of sequence counter 28, base 10, when integrator is discharged to zero, $g$ = constant voltage gain of preamplifier 13, $E_{BIAS}$ = voltage value of biasing voltage 17, $E_{SIGNAL}$ = voltage value of analog voltage signal 90, $E_{DIS}$ = voltage value of discharge voltage signal 21.

The importance of changing the clock signal frequency between conversions is now evident. If the frequency is changed during the integration interval, conversion accuracy deteriorates because the integration interval is longer or shorter than the AC voltage period, with resulting incomplete cancellation of the effects of the superimposed alternating signals. If the frequency is changed during the discharge interval, the conversion accuracy deteriorates because the content of counter 28 at the end of the discharge interval varies from that which is obtained by counting a constant clock frequency throughout the discharge interval.

If desired, latch 38 may be removed and signal 43 generated by a logical inverter, that is responsive to signal 42, while signal 44 can be obtained directly from signal 42. Signal 55 may be disconnected from NAND gates 45 and 46, and pulse signal 37 instead may be connected to NAND gates 45 and 46 in place of signal 55. NAND gate 66 also may be removed. A converter modified in this manner also follows the AC voltage period and controls the clock signal frequency to achieve 4,096 oscillations per AC voltage period, thereby achieving the rejection of alternating signals superimposed on the analog voltage signal, as indicated above in accordance with the invention. However, with modification, the clock signal frequency is changed at any time during a conversion, rather than between conversions.

The foregoing discreption has been presented only to illustrate the principles of the invention. Accordingly, it is desired that the invention not be limited by the embodiment described but rather that it be accorded an interpretation consistent with the scope and spirit of its broad principles.

What we claim is:

1. A dual slope analog to digital converter to convert an analog input signal in response to a conversion request signal generated by a digital data processor, said converter being adapted to reject an AC voltage superimposed on an analog voltage to be converted forming the analog input signal by integrating the analog input signal for a time interval equal to an integer number of cycles of the AC voltage, comprising:

an integrator to integrate and decrease the integral of the analog input signal to zero;

a clock signal generator to generate a series of repetitive pulses;

a sequence counter to count generated clock signal pulses and generate signals in accordance with the counted pulses;

means to detect the time period of each cycle of the AC voltage;

means to control the repetition rate of the clock signal pulses to cause a distinct number of clock signal pulses to occur during a detected AC cycle time period, the conversion request signal being generated at a time independent of the beginning of a detected AC cycle; and means responsive to the signals generated by the sequence counter to govern the integrator to commence integrating an analog input signal in response to the conversion request signal and to continue such integration for a time interval during which the sequence counter counts the distinct number of clock signal pulses, to discharge the integrator thereafter at a constant rate until the output signal of the integrator reaches a predetermined level, and to generate signals representative of the number of clock signal pulses counted by the sequence counter during discharge of the integrator.

2. A converter according to claim 1 further comprising means to detect absence of the AC voltage from an input of the period detecting means and wherein for the duration of a detected absence the control means are responsive to the absence detecting means to hold constant the clock pulse repetition rate at the rate prevailing at the time of cessation of the AC voltage.

3. A converter according to claim 1 further comprising means to generate a synchronizing signal immediately preceeding a conversion in response to a conversion request signal, and wherein the control means are responsive to the synchronizing signal to hold constant the clock pulse repetition rate during a conversion, and to change the repetition rate in the time interval immediately preceding a conversion.

4. A dual slope analog to digital converter to convert an analog input signal in response, to a conversion request signal generated by a digital data processor, said converter being adapted to reject an AC voltage superimposed on an analog voltage to be converted forming the analog input signal by integrating the analog input signal for a time interval equal to an integer number of cycles of the AC voltage, comprising:

an integrator to integrate and decrease the integral of the analog input signal to zero;

a signal generator to generate a pulse train having a constant predetermined pulse repetition rate;

a rate multiplier connected to the signal generator to generate a clock signal having a pulse repetition rate related to the pulse repetition rate of the pulse train in accordance with governing input signals;

an up-down counter to count upwardly pulses of a first input signal and downwardly pulses of a second input signal and to generate signals to govern the rate multiplier in accordance with the pulse count of the first and second input signals;

means to detect the time period of each AC voltage cycle;

means to generate up-down counter input signal pulses to govern the rate multiplier to generate a distinct number of clock signal pulses during a detected AC cycle time period, the conversion request signal being generated at a time independent of the begining of a detected AC cycle;

a sequence counter to count the generated clock signal pulses from the rate multiplier and generate signals in accordance with the counted pulses; and means responsive to the signals generated by the sequence counter to govern the integrator to commence integrating an analog input signal in response to the conversion request signal and to continue such integration for a time interval during which the sequence counter counts the distinct number of clock signal pulses, to discharge the integrator thereafter at a constant rate until the output signal of the integrator reaches a predetermined level, and to generate signals representative of the number of clock signal pulses counted by the sequence counter during discharge of the integrator.

5. A converter according to claim 4 wherein the number of rate multiplier governing input signals is at least twelve.

6. A converter according to claim 4 further comprising means to detect absence of the AC voltage from an input of the period detecting means and wherein the pulse generating means are responsive to the absence detecting means to inhibit generation of up-down counter input signal pulses when the AC voltage is absent.

7. A converter according to claim 4 further comprising means to generate a synchronizing signal immediately preceding a conversion in response to a conversion request signal and wherein said synchronizing signal governs the pulse generating means to generate an up-down counter input signal pulse concurrently with a synchronizing signal.

8. A converter according to claim 4 further comprising a counter to count clock signal pulses generated during counting intervals corresponding to successive detected cycles of the AC voltage, and wherein the rate multiplier is governed to generate during each detected cycle of the AC voltage a distinct number of clock signal pulses in accordance with the state of a predetermined counter bit at the end of each counting interval.

9. A converter according to claim 8 wherein the counter has 13 bits, and the predetermined bit is the most significant.

10. A dual slope analog to digital converter to convert an analog input signal in response to a conversion request signal generated by a digital data processor, said converter being adapted to reject an AC voltage superimposed on an analog voltage to be converted forming the analog input signal by integrating the analog input signal for a time interval equal to an integer number of cycles of the AC voltage, comprising:

an integrator to integrate and decrease the integral of the analog input signal to zero;

a signal generator to generate a pulse train having a constant predetermined pule repetition rate;

a rate multiplier connected to the signal generator to generate a clock signal having a pulse repetition rate related to the pulse repetition rate of the pulse train in accordance with governing input signals;

an up-down counter to count upwardly pulses of a first input signal and downwardly pulses of a second input signal and to generate signals to govern the rate multiplier in accordance with the pulses count of the first and second input signals;

means to detect the time duration of each AC voltage cycle;

a counter to count clock signal pulses generated during counting intervals corresponding to successive detected cycles of the AC voltage, the conversion request signal being generated at a time independent of the beginning of a detected AC cycle;

a latch governed by the AC cycle detecting means to sample a signal representing the state of a predetermined counter bit at the end of each counting interval and to generate an output signal of the same level as the bit signal and an output signal of inverse level as the bit signal;

means responsive to the latch output signals to generate up-down counter input signal pulses to govern the rate multiplier to generate in the time period of a detected AC cycle a distinct number of clock pulses in accordance with the predetermined counter bit;

a sequence counter to count the generated clock signal pulses from the rate multiplier and generate signals in accordance with the counted pulses; and means responsive to the signals generated by the sequence counter to govern the integrator to commence integrating an analog input signal in response to the conversion request signal and to continue such integration for a time interval during which the sequence counter counts the distinct number of clock signal pulses, to discharge the integrator thereafter at a constant rate until the output signal of the integrator reaches a predetermined level, and to generate signals representative of the number of clock signal pulses counted by the sequence counter during discharge of the integrator.

11. A converter according to claim 10 wherein the number of rate multiplier governing input signals is at least 12.

12. A converter according to claim 10 wherein the counter has 13 bits and the predetermined bit is the most significant.

13. A converter according to claim 10 further comprising means to detect absence of the AC voltage from an input of the period detecting means and wherein the pulse generating means are responsive to the absence detecting means to inhibit generation of up-down counter input signal pulses when the AC voltage is absent.

14. A converter according to claim 10 further comprising means to generate a synchronizing signal immediately preceding a conversion in response to a conversion request signal and wherein said synchronizing signal governs the pulse generating means to generate an up-down counter input signal pulse concurrently with the synchronizing signal.

15. A dual slope analog to digital converter to convert an analog input signal in response to a conversion request signal generated by a digital data processor, said converter being adapted to reject an AC voltage superimposed on an analog voltage to be converted forming the analog input signal by integrating the analog input signal for a time interval equal to an integer number of cycles of the AC voltage, comprising:

an integrator to integrate and decrease the integral of the analog input signal to zero;

a signal generator to generate a pulse train having a constant predetermined pulse repetition rate;

a rate multiplier connected to the signal generator to produce a clock signal having a pulse repetition rate related to the pulse repetition rate of the pulse train in accorodance with governing input signals;

an up-down counter to count upwardly pulses of a first input signal and downwardly pulses of a second input signal and to generate signals to govern the rate multiplier in accordance with the pulse count of the first and second input signals;

a squarer responsive to the AC voltage to generate a squared output signal having a first predetermined level during negative half cycles of the AC voltage and a second predetermined level during positive half cycles;

a pulse generator responsive to the squared signal to generate a pair of distinct closely spaced timing pulses when the squared signal changes from the first level to the second;

a counter to count generated clock signal pulses from the rate multiplier and governed to reset on occurrence of the latter-generated timing pulse;

a latch governed to sample a signal representing the state of a predetermined counter bit on occurrence of the first-generated timing pulse and to generate a first output signal of level similar to that of the bit signal and second output signal of inverse level of the bit signal;

means to generate a synchronizing pulse signal immediately preceding a conversion in response to a request conversion signal, the conversion request signal being generated at a time independent of the time of generation of the first-generated timing pulse;

first gating means responsive to the second latch output signal and governed to generate a pulse of the first up-down counter input signal on occurrence of a synchronizing pulse to increase the clock pulse repetition rate whenever the number of clock signal pulses generated during a detected AC voltage cycle is smaller than a distinct number determined in accordance with the predetermined counter bit;

second gating means responsive to the first latch output signal and governed to generate a pulse of the second up-down counter input signal on occurrence of a synchronizing pulse to decrease the clock pulse repetition rate whenever the number of clock signal pulses generated during a detected AC voltage cycle is greater than a distinct number determined in accordance with the predetermined counter bit;

a sequence counter to count the generated clock signal pulses from the rate multiplier and generate signals in accordance with the counted pulses; and means responsive to the signals generated by the sequence counter to govern the integrator to commence integrating an analog input signal in response to the conversion request signal and to continue such integration for a time interval during which the sequence counter counts the distinct number of clock signal pulses, to discharge the integrator thereafter at a constant rate until the output signal of the integrator reaches a predetermined level, and to generate signals representative of the number of clock signal pulses counted by the sequence counter during discharge of the integrator.

16. A converter according to claim 15 wherein there are at least 12 rate multiplier governing input signals.

17. A converter according to claim 15 wherein the counter has 13 bits and the predetermined counter bit is the most significant bit.

18. A converter according to claim 15 further comprising an AC detector to generate an output signal having two distinct levels depending upon the presence or absence of the AC voltage, and wherein the gating means are responsive to the AC detector output signal to inhibit generation of the up-down counter input signal pulses when the AC voltage is absent.

19. A dual slope analog to digital converter adapted to reject an AC voltage superimposed on an analog voltage to be converted forming an analog input signal by integrating the analog input signal for a time interval equal to an integer number of cycles of the AC voltage, comprising:

an integrator to integrate and decrease the integral of the analog input signal to zero;

a clock signal generator to generate a series of repetitive pulses;

a sequence counter to count generated clock signal pulses and generate signals in accordance with the counted pulses;

means to detect the time period of each cycle of the AC voltage;

means to control the repetition rate of the clock signal pulses to cause a distinct number of clock signal pulses to occur during a detected AC cycle time period;

means responsive to the signals generated by the sequence counter to govern the integrator to integrate an analog input signal for a time interval during which the sequence counter counts the distinct number of clock signal pulses, to discharge the integrator thereafter at a constant rate until the output signal of the integrator reaches a predetermined level, and to generate signals representative of the number of clock signal pulses counted by the sequence counter during discharge of the integrator; and means to detect absence of the AC voltage from an input of the period detecting means; and wherein for the duration of a detected absence the control means are responsive to the absence detecting means to hold constant the repetition rate of the clock signal at the rate prevailing at the time of cessation of the AC voltage.

20. A converter according to claim 19 wherein the clock signal generator comprises:

a signal generator to generate a pulse train having a constant predetermined pulse repetition rate;

a rate multiplier connected to the signal generator to generate a clock signal having a pulse repetition rate related to the pule repetition rate of the pulse train in accordance with governing input signals; and an up-down counter to count upwardly pulses of a first input signal and downwardly pulses of a second input signal and to generate signals to govern the rate multiplier in accordance with the pulse count of the first and second input signals; and the control means generates pulses of the first and second input signals, the control means being responsive to the absence detecting means to inhibit generation of such pulses during a detected absence of the AC signal from the input of the period detecting means.

21. A dual slope analog to digital converter adapted to reject an AC voltage superimposed on an analog voltage to be converted froming an analog input signal by integrating the analog input signal for a time interval equal to an integer number of cycles of the AC voltage, comprising:

an integrator to integrate and decrease the integral of the analog input signal to zero;

a clock signal generator to generate a series of repetitive pulses;

a sequence counter to count generated clock signal pulses and generate signals in accordance with the counted pulses;

means to detect the time period of each cycle of the AC voltage;

means to control the repetition rate of the clock signal pulses to cause a distinct number of clock signal pulses to occur during a detected AC cycle time period;

means responsive to the signals generated by the sequence counter to govern the integrator to integrate an analog input signal for a time interval during which the sequence counter counts the distinct number of clock signal pulses to discharge the integrator thereafter at a constant rate until the output signal of the integrator teaches a predetermined level, and to generate signals representative of the number of clock signal pulses counted by the sequence counter during discharge of the integrator; and means responsive to a conversion request signal to govern the control means to vary the pulse repetition rate of the clock signal before integration of an analog input signal commences, the pulse repetition rate of the clock signal being constant during a conversion.

22. A converter according to claim 21 wherein the clock signal generator comprises:

a signal generator to generate a pulse train having a constant predetermined pulse repetition rate;

a rate multiplier connected to the signal generator to generate a clock signal having a pulse repetition rate related to the pulse repetition rate of the pulse train in accordance with governing input signals; and an up-down counter to count upwardly pulses of a first input signal and downwardly pulses of a second input signal and to generate signals to govern the rate multiplier in accordance with the pulse count of the first and second input signal; and the control means include means to generate pulses of the first and second input signals of the up-down counter, the pulse generating means being governed by the governing means to generate such pulses substantially in concurrence with the conversion request signal.

* * * * *